United States Patent [19]

Alexander

[11] Patent Number: 4,977,635
[45] Date of Patent: Dec. 18, 1990

[54] CONTROL CIRCUIT FOR VERTICALLY STORING DOCK LEVELER

[75] Inventor: James C. Alexander, London, Canada

[73] Assignee: Serco Corporation, Ontario, Canada

[21] Appl. No.: 373,547

[22] Filed: Jun. 30, 1989

[51] Int. Cl.⁵ .............................................. E01D 1/00
[52] U.S. Cl. ...................................... 14/71.3; 14/71.7
[58] Field of Search ..................... 14/71.1, 71.3, 71.7

[56] References Cited

U.S. PATENT DOCUMENTS

| | | | |
|---|---|---|---|
| 2,554,145 | 5/1951 | Holdeman | 14/42 X |
| 3,656,199 | 4/1972 | Bregantini | 14/71.7 |
| 4,343,058 | 8/1982 | Loblick | 14/71.7 |
| 4,383,549 | 5/1983 | Maldavs | 137/514.7 |

Primary Examiner—Ramon S. Britts
Assistant Examiner—Matthew Smith
Attorney, Agent, or Firm—Sughrue, Mion, Zinn, Macpeak & Seas

[57] ABSTRACT

In a vertically storing dock leveler having a platform which is stored in an upright position, a control circuit which enables retention of the platform in position in response to power failure, and which compensates for possible operator error or inattentiveness during power failure. A normally closed main solenoid valve can be opened only by pressing a lower switch to lower the platform. During normal operation, the valve will remain open to enable the platform to float, but when the platform is to be raised, or electrical power is removed, the valve is closed. As a result, after the platform is raised, the pressure in the main lift cylinder is maintained, and the platform stays at its upright position. Also, during an electrical power interruption, the deck is prevented from falling.

4 Claims, 4 Drawing Sheets

CONTROL CIRCUIT FOR VERTICALLY STORING DOCK LEVELER

BACKGROUND OF THE INVENTION

This invention relates to an electric and hydraulic control circuit for a vertically storing dock leveler, offering, among other features, enhanced control over a platform of the leveler in emergency situations.

There are horizontally storing and vertically storing dock levelers. Horizontally storing dock levelers are stored so that their platforms are raised into position for operation, and vertically storing dock levelers are stored so that their platforms are lowered into position for operation. A conventional horizontally storing dock leveler usually is installed in a pit in a bay of a loading dock. The platform version is raised into position using an hydraulic pump which pumps fluid, usually oil, through various control valves to and from hydraulic cylinders. Once the deck is raised to a sufficient height, and the lip is extended, the deck is allowed to fall by gravity so that it may float up and down with the truck or other vehicle being loaded.

Some horizontally storing models have employed an hydraulic circuit including a normally open (N/O) main solenoid valve, and an electrically operated "emergency stop" valve to hold the deck in a partially raised position. An example of the electrical and hydraulic control circuits for this conventional approach are shown in FIGS. 1 and 2.

In FIG. 2, a pump manifold 1 contains a shuttle valve 25, a pump 30, and a motor 35. When the motor 35 is energized, and the pump 30 is started, fluid is caused to flow from a reservoir 7 through the pump 30. The shuttle valve 25 thus is moved to the left, so that fluid flows through the conduit indicated by arrow 25a, out of a primary port 3 of the pump manifold 1.

Fluid flowing out of the primary port 3 enters a lip cylinder 160 at its retract (rod) end, and also passes through solenoid valve 20 to a main lift cylinder 110. Fluid flowing into both places causes the main lift cylinder 110 to extend, and fluid to flow out of the extend (piston) end of the lip cylinder 160 and into a secondary port 5. A sequence valve 15 is set so that fluid entering the secondary port 5 passes through the valve 15 and into the reservoir 7. As a result, the lip of the leveler retracts as the platform extends.

When the main lift cylinder is fully extended, pressure builds at the primary port 3. As a result, the sequence valve 15 is switched over (in FIG. 2, it is moved to the right against pressure exerted by a spring 16), so that flow may be reversed through the secondary port 5. As a result, the lip cylinder 160 extends, causing the lip of the leveler to extend. Thus, the lip extends after the platform extends.

In the course of operation, when an emergency stop switch 10 (FIG. 1) is pressed, the main solenoid valve 20, which is a spool valve, is energized. The valve 20 normally is open, and permits fluid flow in either of two directions when open. However, energization of the valve 20 causes it to close, prohibiting fluid flow in either direction. As a result, the platform cannot be lowered.

With a normally open valve system, it also happens that when the platform is lowered from a raised position, it cannot be stopped unless the pump 30 is started or the emergency stop switch 10 is depressed. Both of these actions require electrical power. Thus, if there is a power failure, the platform will fall because there is nothing to stop it. The fall is controlled by the rate of fluid flow through the left-hand portion of the shuttle valve.

Vertically storing dock levelers, such as the one shown in FIGS. 3A and 3B, special consideration because when they are stored, people can walk all around them. Thus, it is important that the platform 40 not fall for any reason while it is stored, or while it is being lowered. A system such as that described above for horizontally storing dock levelers, then, would be inappropriate for vertically storing levelers, because in the event of loss of electrical power, the platform naturally would lower in an out of control manner, causing a potential danger to those in its path. Even having an electrically operated emergency stop control, for a system with a normally open valve, would not solve this problem because the platform still could fall in the event of electrical failure. Further, the platform could not be raised (i.e. stored) in the event of power failure.

One type of vertically storing dock leveler control circuit uses a normally closed (N/C) main solenoid valve which requires electrical power in order to open. The operation of such a valve, then, would be the opposite of that for a normally open valve. Examples of the electrical and hydraulic circuits for such a system are shown in FIGS. 4 and 5.

In FIG. 5, a pump manifold 150 includes a shuttle valve 152, a primary port 153, a sequence valve 154, a secondary port 155, a reservoir 157, a pump 162, and a motor 164. A main difference between this hydraulic circuit and that of FIG. 2 is that, when the main solenoid valve 100 is in its normally closed position, fluid cannot flow into or out of the main lift cylinder 110, so that the platform remains locked.

In operation, first a lock/unlock switch 130 (FIG. 4) is turned to the unlock position, energizing the solenoid valve 100, and permitting fluid flow through the valve. This fluid flow allows the platform 40 to float at a speed determined by the rate of fluid flow. In normal operation, this switch 130 remains in the unlock position, to permit the platform to float up and down with the truck which is being loaded or unloaded.

To raise the platform, a raise button 120 is pushed, which causes the platform 40 to rise. When the platform is raised, the raise button is released, and the lock/unlock switch 130 is turned to the lock position, deenergizing the solenoid and closing the valve 100 to keep the platform 40 raised. This type of valve requires two types of action, then, to raise and stop the deck. First, the lock/unlock switch 130 must be turned to the unlock position to open the valve (this is done at the start of operation), and second, the raise button 120 must be pressed to start the motor 35 (after operation is complete, and the platform 40 is to be stored). Similarly, to stop the deck, first the raise button must be released, and second, the lock/unlock switch 130 must be turned to the lock position (closed) as soon as the raise switch 120 is released. If the lock/unlock switch 130 is not in the lock position, the deck will fall again.

An additional deficiency of this type of control valve is that, if the lock/unlock switch 130 inadvertently is left in the unlocked position when there is a power failure, the valve will open as soon as power is restored, allowing the platform 40 to fall, because fluid will be able to flow out of the main lift cylinder 110, resulting in a potentially dangerous situation.

SUMMARY OF THE INVENTION

In view of the foregoing, it is one object of the invention to provide a control circuit for a vertically storing dock leveler, which enables the position of the platform to be maintained, in the event of power failure, by automatically closing the main solenoid valve whenever electrical power is removed.

It is another object of the invention to provide such a control circuit, in which raising of the deck automatically causes the main solenoid valve to be closed.

To achieve the foregoing and other objects, the control circuit of the invention includes a normally closed main solenoid valve which is opened to lower the leveler platform. When the deck has been lowered for operation, any other electrical operation of the system, be it the raising of the deck or the removal of electrical power, will cause the main valve solenoid to be released and the valve to close. When power is restored, only an affirmative action—the depression of the lower switch—will cause the valve to open again.

BRIEF DESCRIPTION OF THE DRAWINGS

The foregoing and other objects and features of the invention will become apparent from the following detailed description of a preferred embodiment of the invention, taken with reference to the accompanying drawings, in which.

DETAILED DESCRIPTION OF A PREFERRED EMBODIMENT

Figure 6:
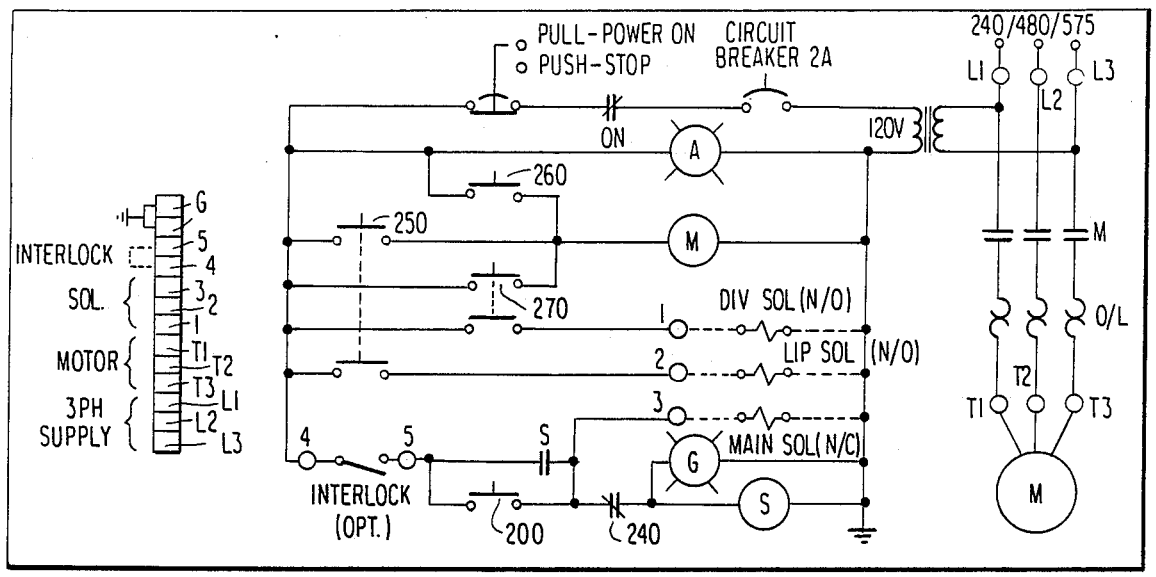
FIGS. 6 and 7 are an electrical and an hydraulic schematic, respectively, for a control circuit employing a normally closed valve for the emergency stop feature in a vertically storing dock leveler according to the invention.
Figure 7:
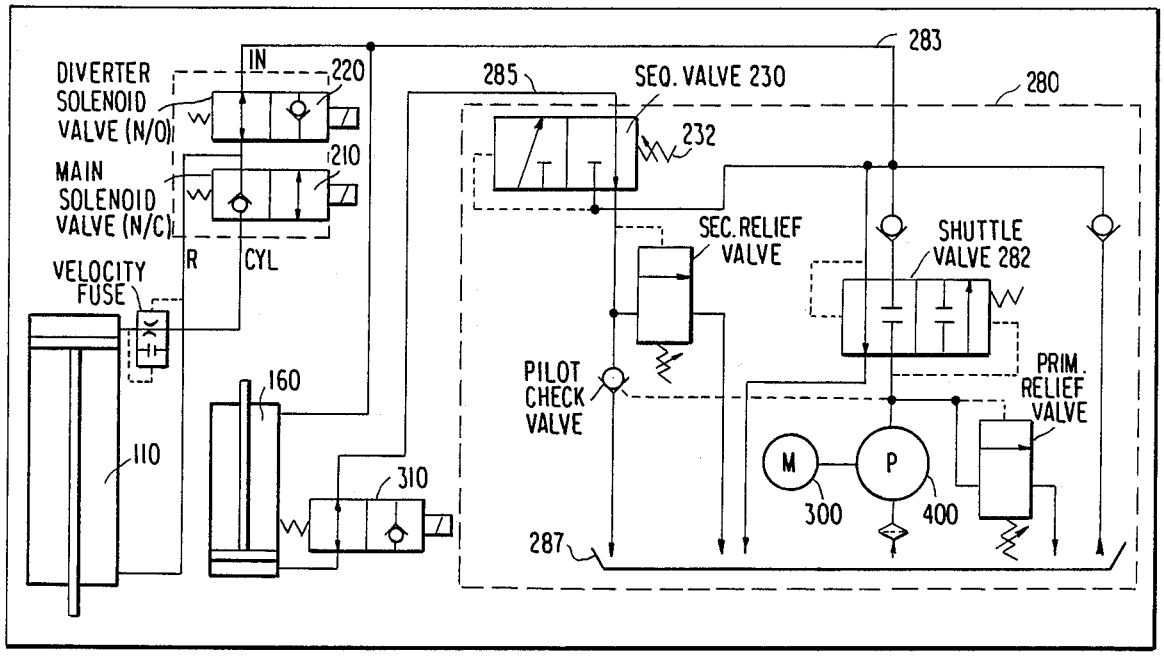

Looking at FIGS. 6 and 7, the control circuit of the invention operates as follows. When a motor 300 in a pump manifold 280 is energized, a pump 400 is started, and fluid (oil) is pumped from a reservoir 287 through a shuttle valve 282 and out a primary port 283. Fluid flows into a normally open diverter solenoid valve 220 and a normally closed main solenoid valve 210, and into a main lift cylinder 110. Oil also would flow out the extend end of a lip cylinder 160, through a sequence valve 230 and into the reservoir 287, causing the lip 50 to retract, but is prevented from doing so when a normally open lip solenoid valve 310 is closed. As will be seen, this arrangement can prevent the lip 50 from retracting during movement of the platform 40.

The main solenoid valve 210 is a poppet style valve. When it is open, fluid may flow freely in both directions. When it is closed, fluid may flow freely into the main lift cylinder 110, but not out of it.

When a lower switch 200 (FIG. 6) is depressed, the coil of a normally open relay S is energized, and the normally open contacts are closed. The normally closed main solenoid valve 210 thus is opened, permitting fluid flow out of the main lift cylinder 110, so that the platform 40 may fall. After the lower switch 200 is released, the coil of the relay S remains energized, so that the main solenoid valve 210 remains open. Thus, the platform 40 is able to continue lowering and to float up or down with the deck of the vehicle being loaded or unloaded.

When the deck is raised by pressing the raise switch 250, the motor 300 is energized, operating the pump 400 and causing fluid to flow into the main lift cylinder 110, and the platform 40 to rise. Pressing the raise switch 250 also causes the normally closed contacts of the relay 240 to open, and voltage to be removed from the coil of the relay S. Thus, the main solenoid valve 210 closes.

Since the main solenoid valve 210 is a poppet style valve, when it is closed, fluid is not permitted to flow out of the main lift cylinder 110, but fluid still can flow to the cylinder 110, so that pressure continues to build in the main lift cylinder 110, and the platform 40 can continue to rise.

Once the platform 40 is fully raised, the main lift cylinder 110 is fully extended, and pressure builds at the primary port 283 of the pump manifold 280. As a result, the sequence valve 230 shifts against pressure provided by a spring 232, causing the valve 230 to switch positions. As a result, fluid flows out of the secondary port 285, rather than into it. The normally open lip solenoid valve 310 permits fluid to flow into the extend end of the lip cylinder 160, causing it to extend, and hence extending the lip 50.

In the event of power failure, voltage again is removed from the coil of the relay S, and the main solenoid valve 210 closes, thus preventing the platform from moving, because no fluid can flow into or out of the main lift cylinder 110. (While the poppet valve style of the main solenoid valve allows fluid flow into the main lift cylinder 110, if there is no power, no fluid will be pumped into the main lift cylinder 110.)

Figure 1:
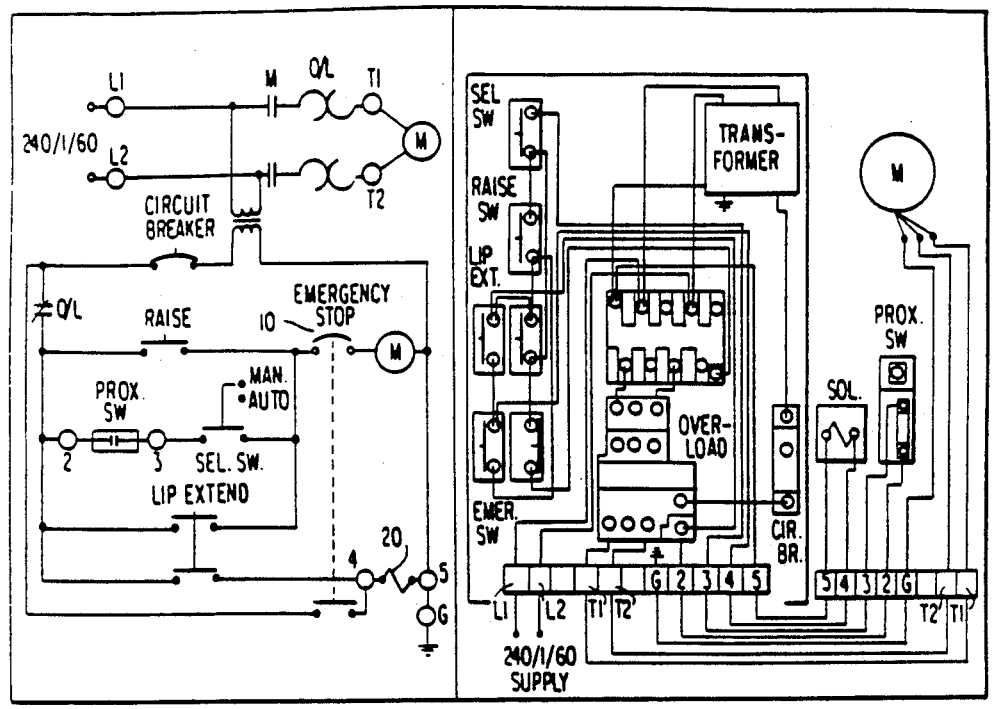
FIGS. 1 and 2 are an electrical and an hydraulic schematic, respectively, for a control circuit employing a normally open valve for the emergency stop feature in a conventional pit style dock leveler.
Figure 2:
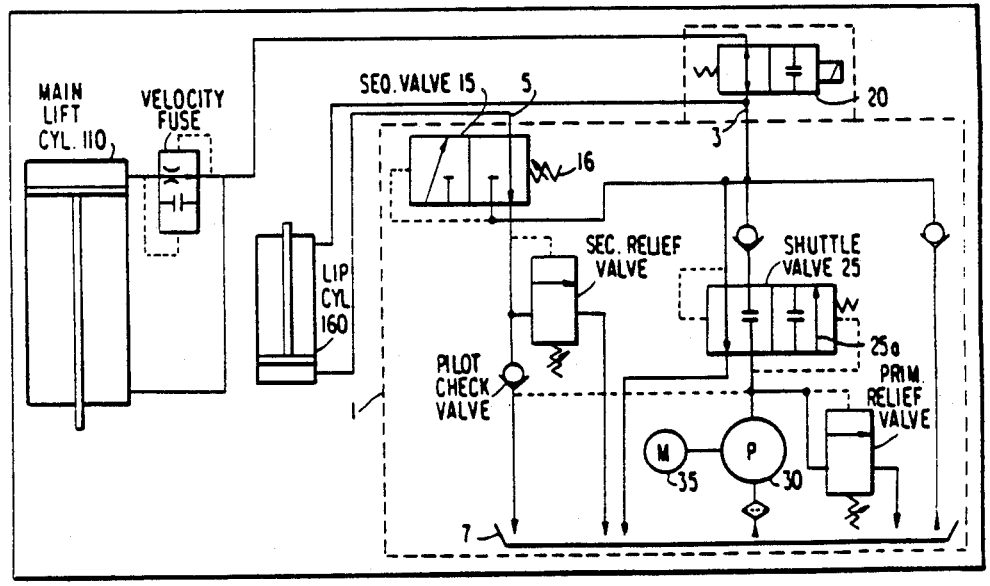
Figure 3A:
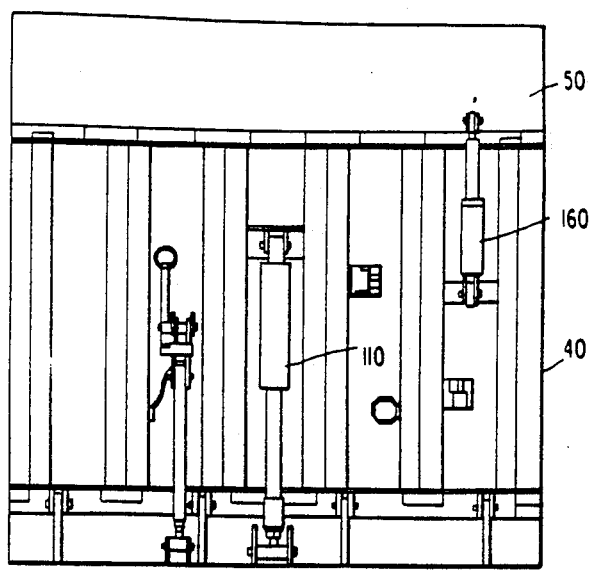
FIGS. 3A and 3B shows a schematic view of the principal operational portions of a vertical dock leveler.
Figure 3B:
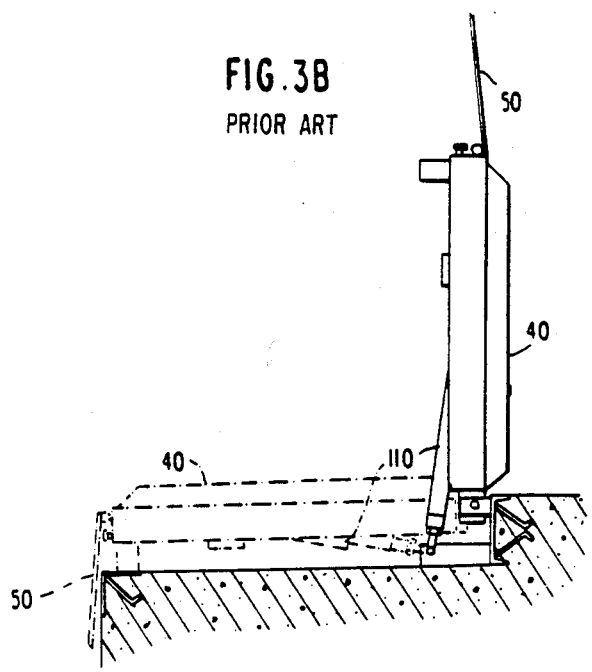
Figure 4:
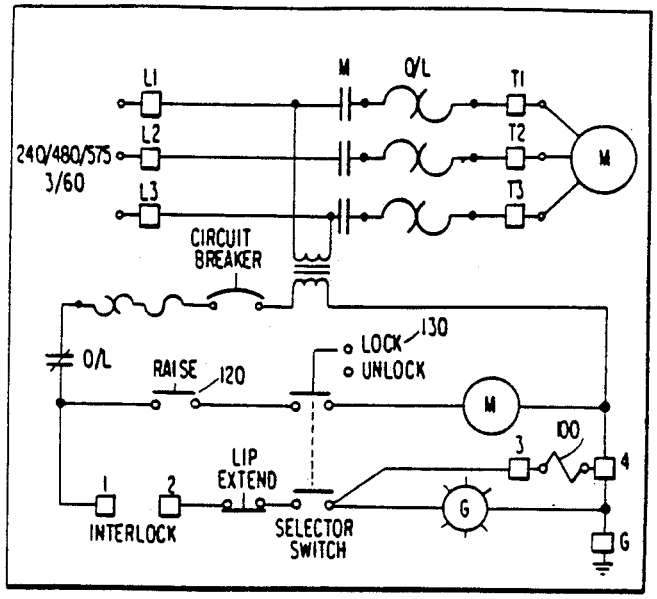
FIGS. 4 and 5 are an electrical and an hydraulic schematic, respectively, for a control circuit employing a normally closed valve for the emergency stop feature in a conventional vertically storing dock leveler.
Figure 5:
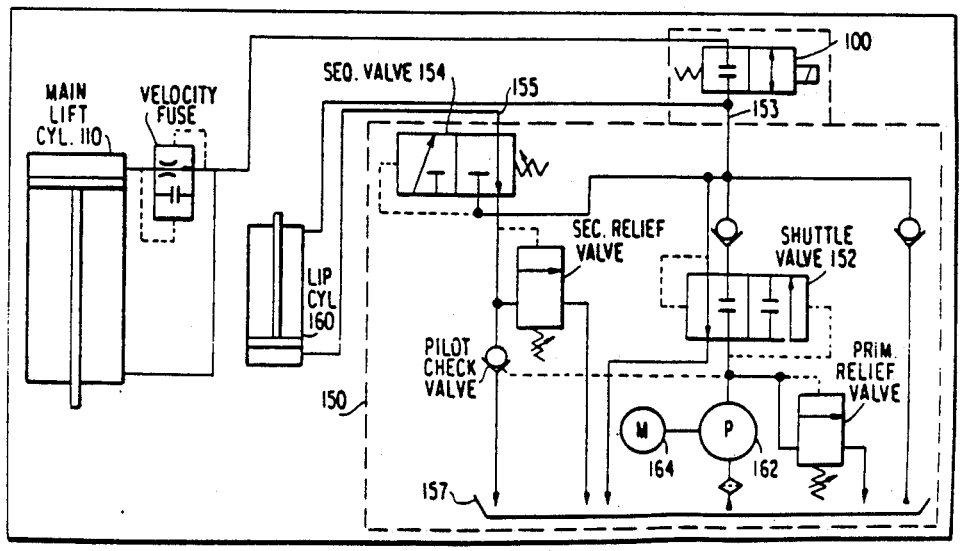

Any other operation of the control circuit will have the same effect of closing the main solenoid valve 210. For example, if the lip retract switch 260 is pushed to cause a lip 50 (FIG. 3) to retract through retraction of the lip cylinder 160, the contacts of the relay S again will open, and the main solenoid valve 210 will close, though again fluid can flow into the main lift cylinder 110.

Similarly, if the lip extend switch 270 is pushed, the contacts of the relay S open, and the main solenoid valve 210 closes. Normally, fluid still would be permitted to flow into the main lift cylinder 110 via the poppet valve. However, as seen from the electrical schematic of FIG. 6, the normally open diverter solenoid valve 220 is closed by pressing the lip extend switch 270. The diverter solenoid valve 220 is a poppet style valve, as is the main solenoid valve 210. When energized, the valve 220 prohibits fluid flow into the main lift cylinder 110; when the main solenoid valve is deenergized, fluid flow out of the cylinder 110 also is prohibited, so that the platform 40 does not move.

Other aspects of the operation and interrelationship among the depicted control circuits are less germane to the discussion here, and so for the sake of convenience a detailed description is omitted. However, the following can be noted.

The operation of the normally open lip solenoid valve 310, and the main and diverter solenoid valves 210, 220, may be such that, for example, when the lip extend switch 270 is pushed, so that fluid flows to the lip cylinder 160, the normally open diverter solenoid valve 220 may be energized so that fluid is prevented from flowing to the main lift cylinder 110. In this manner, the pressure from the pump builds rapidly, causing the sequence valve to shift, and the fluid to flow to the lip cylinder 160, causing pressure to build, and the lip to extend. Also, when the raise switch 250 is pushed, the lip solenoid 310 may be energized, preventing the lip 50 from retracting.

With the foregoing combination of functions, the lip 50 may be extended before the platform 40 is raised for storage, if desired, instead of waiting for the platform 40 to be raised and the lip 50 to be extended through operation of the sequence valve 230, which reacts to a predetermined pressure in the main lift cylinder 110 to cause fluid flow to be diverted to the lip cylinder 160.

While the foregoing has been provided with reference to a preferred embodiment, various changes within the spirit of the invention will be apparent to those of working skill in this technical field. Thus, the invention is to be considered as limited only by the scope of the appended claims.

What is claimed is:

1. A control circuit for a vertically storing dock leveler, said leveler comprising a platform and a main hydraulic cylinder for controlling a position of said platform, said control circuit comprising:
   normally closed valve means for normally closing off fluid flow from said main hydraulic cylinder; and
   raising and lowering means for raising and lowering said platform, including:
      a raising and a lowering switch, each having at least two positions; and
      an electric circuit, responsive to at least one of said at least two positions of said lowering switch, for opening said normally closed valve means to enable flow of fluid to and from said main hydraulic cylinder, said electric circuit being responsive to at least one of said at least two positions of said raising switch for closing said normally closed valve means to prevent flow of fluid from said main hydraulic cylinder, said electric circuit further being responsive to interruption of electric power, normally applied thereto, to prevent said flow of said fluid from said main hydraulic cylinder, wherein said electric circuit comprises at least first and second relays, said first relay being energized in response to said at least one of said at least two positions of said lowering switch for opening said normally closed valve means, said second relay being energized in response to said at least one of said at least two positions of said raising switch for closing said normally closed valve means.

2. A control circuit as claimed in claim 1, wherein said leveler further comprises a lip pivotably connected to said platform, and a lip hydraulic cylinder for controlling a position of said lip, said control circuit further comprising:
   normally open valve means for normally permitting fluid flow to and from said lip hydraulic cylinder; and
   extending and retracting means for extending and retracting said lip, said extending and retracting means further comprising:
      an extending switch and a retracting switch, each having at least two positions, said normally open valve means being responsive to at least one of said at least two positions of said extending switch for closing off fluid flow from said lip hydraulic cylinder, said normally open valve means being responsive to at least one of said at least two positions of said retracting switch for opening fluid flow from said lip hydraulic cylinder,
   wherein said first relay is responsive to said at least one of said at least two positions of said extending switch and to said at least one of said at least two positions of said retracting switch for closing said normally closed valve means.

3. A control circuit for a vertically storing dock leveler, said leveler comprising a platform, a main hydraulic cylinder for controlling a position of said platform, a lip pivotably connected to said platform, and a lip hydraulic cylinder for controlling a position of said lip, said control circuit comprising:
   normally closed valve means for normally closing off fluid flow from said main hydraulic cylinder;
   raising and lowering means for raising and lowering said platform, including:
      a raising and a lowering switch, each having at least two positions; and
      an electric circuit, responsive to at least one of said at least two positions of said lowering switch, for opening said normally closed valve means to enable flow of fluid to and from said main hydraulic cylinder, said electric circuit being responsive to at least one of said at least two positions of said raising switch for closing said normally closed valve means to prevent flow of fluid from said main hydraulic cylinder, said electric circuit further being responsive to interruption of electric power, normally applied thereto, to prevent said flow of said fluid from said main hydraulic cylinder;
   normally open valve means for normally permitting fluid flow to and from said lip hydraulic cylinder; and
   extending and retracting means for extending and retracting said lip, said extending and retracting means further comprising:
      an extending switch and a retracting switch, each having at least two positions, said normally open valve means being responsive to at least one of said at least two positions of said extending switch for closing off fluid flow from said lip hydraulic cylinder, said normally open valve means being responsive to at least one of said at least two positions of said retracting switch for opening fluid flow from said lip hydraulic cylinder,
   wherein said electric circuit is responsive to said at least one of said at least two positions of said extending switch and to said at least one of said at least two positions of said retracting switch for closing said normally closed valve means.

4. A control circuit as claimed in claim 3, wherein said electric circuit comprises at least first and second relays, said first relay being energized in response to said at least one of said at least two positions of said lowering switch for opening said normally closed valve means, said second relay being energized in response to said at least one of said at least two positions of said raising switch for closing said normally closed valve means.

* * * * *